(12) United States Patent
Guerin

(10) Patent No.: US 10,188,042 B2
(45) Date of Patent: Jan. 29, 2019

(54) ROUND BALER WITH BALE WRAPPER

(71) Applicant: Deere & Company, Moline, IL (US)

(72) Inventor: Sebastien Guerin, Besancon (FR)

(73) Assignee: DEERE & COMPANY, Moline, IL (US)

( * ) Notice: Subject to any disclaimer, the term of this patent is extended or adjusted under 35 U.S.C. 154(b) by 549 days.

(21) Appl. No.: 14/887,389

(22) Filed: Oct. 20, 2015

(65) Prior Publication Data
US 2016/0120128 A1 May 5, 2016

(30) Foreign Application Priority Data

Oct. 30, 2014 (DE) .................. 10 2014 222 213

(51) Int. Cl.
*A01F 15/07* (2006.01)
*B65B 11/02* (2006.01)
(Continued)

(52) U.S. Cl.
CPC ............ *A01F 15/071* (2013.01); *A01F 21/00* (2013.01); *B65B 11/025* (2013.01); *B65B 45/00* (2013.01);
(Continued)

(58) Field of Classification Search
CPC .... A01F 15/07; A01F 15/071; A01F 15/0715; A01F 15/08; A01F 2015/073;
(Continued)

(56) References Cited

U.S. PATENT DOCUMENTS 2,643,604 A * 6/1953 Hansen ................. A01D 87/125
100/188 R
3,641,841 A * 2/1972 Komori ..................... F16P 3/04
74/615
(Continued)

FOREIGN PATENT DOCUMENTS

CA  2452453 C  2/2008
DE  20005963 U1  6/2000
(Continued)

OTHER PUBLICATIONS

German Search Report issued in counterpart application No. 10 2014 222 213.3, dated Jun. 30, 2015 (7 pages).
(Continued)

*Primary Examiner* — Gloria R Weeks
*Assistant Examiner* — Dariush Seif

(57) ABSTRACT

A round baler with a bale wrapper is described wherein the bale wrapper includes a bale wrapping unit rotating about a vertical axis of rotation and having rotation arms which extend parallel to the axis of rotation and which support reels of wrapping material guided within an action region of the bale wrapping unit extending transversely and longitudinally to the axis of rotation, wherein a delimiting rod linkage is arranged on the round baler or on the bale wrapper and extends at the back of the round baler and is capable of pivoting from an upper position into a lower position and vice versa, and with which in the lower position an area of the action region of the bale wrapping unit placed at the back of the round baler is demarcated horizontally.

12 Claims, 2 Drawing Sheets

(51) Int. Cl.
*B65B 45/00* (2006.01)
*A01F 21/00* (2006.01)

(52) U.S. Cl.
CPC . *A01F 2015/073* (2013.01); *A01F 2015/0735* (2013.01)

(58) Field of Classification Search
CPC ... A01F 2015/0735; A01F 21/00; F16P 3/001; F16P 3/006; F16P 3/06; B65B 11/00; B65B 11/04; B65B 11/025; B65B 59/04; B65B 45/00
USPC ... 53/397, 399, 587, 588, 389.2–389.4, 393, 53/77; 100/87–89, 349, 350, 351, 352; 182/2.7, 113; 56/341; 192/129 R, 130, 192/131 R, 133, 135
See application file for complete search history.

(56) References Cited

U.S. PATENT DOCUMENTS

| | | | | |
|---|---|---|---|---|
| 3,687,060 | A * | 8/1972 | Komori | F16P 3/006 100/349 |
| 4,228,638 | A * | 10/1980 | Rabe | A01F 15/0816 100/74 |
| 4,457,403 | A * | 7/1984 | Ream | B66F 11/042 182/141 |
| 5,661,961 | A * | 9/1997 | Westhoff | A01F 15/106 100/88 |
| 5,884,556 | A * | 3/1999 | Klepacki | B30B 9/3053 100/229 A |
| 6,457,295 | B1 * | 10/2002 | Arnold | A01F 15/0833 177/135 |
| 7,000,371 | B2 * | 2/2006 | Viaud | A01F 15/071 100/88 |
| 8,028,499 | B2 * | 10/2011 | Viaud | A01F 15/071 100/4 |
| 8,336,142 | B1 * | 12/2012 | See | A61G 13/1215 5/633 |
| 2003/0024407 | A1 * | 2/2003 | Ehrenpfort | A01F 15/071 100/8 |
| 2003/0070392 | A1 * | 4/2003 | Lacey | A01F 15/071 53/399 |
| 2004/0134177 | A1 * | 7/2004 | Viaud | A01F 15/071 56/341 |
| 2009/0249746 | A1 * | 10/2009 | Viaud | A01F 15/071 53/399 |
| 2012/0067003 | A1 * | 3/2012 | Reijersen Van Buuren | A01F 15/071 53/203 |
| 2012/0090273 | A1 * | 4/2012 | Reijersen Van Buuren | A01F 15/071 53/461 |
| 2012/0090274 | A1 * | 4/2012 | Reijersen Van Buuren | A01F 15/071 53/461 |
| 2012/0210886 | A1 * | 8/2012 | Reijersen Van Buuren | A01F 15/071 100/7 |
| 2014/0261022 | A1 * | 9/2014 | Smith | A01F 15/0883 100/40 |
| 2015/0245563 | A1 * | 9/2015 | Heaney | A01F 15/071 53/52 |
| 2015/0338021 | A1 * | 11/2015 | Beaudoin | B30B 9/3014 100/349 |

FOREIGN PATENT DOCUMENTS

| | | |
|---|---|---|
| DE | 10257252 A1 | 8/2004 |
| EP | 1266562 A1 | 12/2002 |
| EP | 1438889 B1 | 10/2005 |
| WO | 9307059 A1 | 4/1993 |

OTHER PUBLICATIONS

European Search Report in foreign counterpart application No. 15189122.3 dated Mar. 9, 2016 (7 pages).

* cited by examiner

ROUND BALER WITH BALE WRAPPER

CROSS-REFERENCE TO RELATED APPLICATIONS

Pursuant to 35 USC § 119, this application claims the benefit of and priority to German patent application no. 102014222213.3, filed on Oct. 30, 2014, which is herein incorporated by reference in its entirety.

FIELD OF THE DISCLOSURE

The invention relates to a round baler with a bale wrapper.

BACKGROUND

Round balers with bale wrappers are known, more particularly round balers wherein the bale wrapper is connected to the round baler either as an additional trailer unit or as an integrated built-in assembly, so that bales pressed by the round baler can be wrapped up in one work cycle. The bale wrappers have a rotating bale wrapping device which is fitted by way of example with two rotation arms which are guided vertically around the bales and support reels of wrapping material. The rotation arms and reels are guided along a circular path around the bales and the wrapping material guided on the reels is thereby wrapped around the bales. At the same time the bale mounted on a wrapping table after being unloaded from the pressing chamber is rotated about its axis of rotation so that after a few revolutions of the reel the entire round bale is wrapped. The rotation arms which are circulating around the bale define an action region of the bale wrapper. This frequently leads to injury and accidents where an operator or third party carelessly moves into the action region. It is therefore generally endeavoured to avoid this when using round balers with bale wrappers wherein new safety standards are to be met (more particularly according to ISO 4254-14).

SUMMARY

The object of the invention is therefore to provide a round baler with bale wrapper which takes into account the requirements mentioned above and provides a corresponding safety measure.

This is achieved according to the invention by the teaching of patent claim 1. Further advantageous configurations and developments of the invention are apparent from the dependent claims.

According to the invention a round baler with bale wrapper is proposed wherein the bale wrapper comprises a bale wrapping device which is rotatable about a vertical axis of rotation and which has rotation arms extending parallel to the axis of rotation whereat reels for wrapping material are guided inside an action region of the bale wrapping device extending transversely and longitudinally relative to the axis of rotation, wherein a delimiting rod linkage is arranged on the round baler or on the bale wrapper and extends at the back of the round baler and is capable of pivoting from an upper position into a lower position and vice versa and with which in the lower position an area of the action region of the bale wrapping device placed at the back of the round baler is demarcated horizontally. A robust and stable delimiting rod linkage can be provided which, when necessary, namely during the bale wrapping process, can be pivoted down and surrounds the action chamber and demarcates it on the outside. An operator or third party is thereby effectively prevented (protected) from passing into the action chamber. The delimiting rod linkage is to be easily removed again from the action region of the bale wrapper whereby it is pivoted into an upper position, into the transport or bale ejection position. The lower position represents the delimiting or bale wrapping position.

The delimiting rod linkage comprises several rod linkage parts wherein first rod parts are arranged on each side of the round baler or bale wrapper and are positioned on horizontal pivotal axes on the round baler or on the bale wrapper. The first rod linkage parts can be arranged for pivotal movement on each side of the round baler or the bale wrapper, preferably at the sides on the back or a rear region of the round baler or on the sides of the bale wrapper close to the back of the round baler. Actuators (positioning cylinders, electric motors) are preferably provided with which the first rod linkage parts can be pivoted.

The pivotal axes are preferably arranged at an acute angle to the transverse direction of the round baler so that the first rod linkage parts pivot inclined backwards and outwards as the delimiting rod linkage is pivoted from the upper position into the lower position. In other words: as the first rod linkage parts are pivoted, the pivotal ends of the first rod parts are displaced laterally outwards in a pivotal motion moving simultaneously from top to bottom in relation to the round baler, or vice versa, are displaced from outwards inwards in a pivotal motion moving from bottom to top in relation to the round baler. This has the advantage that the delimiting rod linkage in the transport or bale ejection position occupies a smaller width than in the delimiting or bale wrapping position. Thus the delimiting rod linkage in the delimiting or bale wrapping position can project over the sides of the round baler or bale wrapper and demarcate a certain region beyond the sides of the bale wrapper and form a corresponding delimiting protection.

For transport purposes the delimiting rod linkage is brought into the upper position whereby the ends of the rod linkage parts projecting over the sides are moved inwards again and thus lie within the permitted transport width of the round baler.

The delimiting rod linkage comprises second rod linkage parts adjoining with articulation the first rod linkage parts on each side. The second rod linkage parts are preferably held in a constant horizontal alignment, i.e. that their horizontal alignment does not change during pivotal movement of the delimiting rod linkage or the first rod linkage parts, and only changes the height and position in the longitudinal direction of the round baler. Thus the second rod linkage part during pivotal movement is brought from a rear lower position into a front upper position in relation to the longitudinal direction of the round baler. Relative movements between the first and the second rod linkage part can take place through the second rod linkage part which adjoins the first rod linkage part with articulation, and these particularly occur during pivotal movement of the delimiting rod linkage.

The second rod parts are brought together with articulated movement at their ends facing away from the first rod parts. This produces a closure round the back of the bale wrapper. The entire action region which would be accessible for an operator or a third party during a bale wrapping process can thus be shut off by the delimiting rod linkage.

The first rod parts on each side can be formed as a parallelogram rod linkage wherein a parallel guide of the ends connected to the second rod parts relative to the ends which are fastened on the round baler or the bale wrapper is guaranteed. An alignment of the end which is connected to the second rod linkage part is also constantly provided independently of the pivotal position of the first rod linkage part.

The second rod parts are connected for articulation to the first rod parts or to one another by vertically aligned articulated axes. The vertically aligned articulated axes can be formed as an extension of the parallel guided ends of the first rod parts or also as articulated bolts positioned or fixed on the ends. The second rod parts are attached for pivotal movement on the vertically aligned articulated axes. The second rod part can pivot in the transverse direction, thus outwards and inwards relative to the centre of the round baler, through a position of the articulated bolts maintained vertical throughout during pivotal movement, by way of example through the parallel guide of the first rod part. A connection of the ends of the second articulated parts not connected to the first articulated parts by a vertical articulated axis leads to a previously mentioned closure of the action region of the bale wrapper. Thus the first rod parts fixed at the back to the round baler form together with the second rod parts attached to the first rod parts, and the combination of the second rod parts with one another form a delimiting rod linkage which surrounds or defines about three quarters of the action region of the bale wrapper. The remaining quarter of the action region of the bale wrapper not enclosed by the delimiting rod linkage is covered or demarcated by the back of the round baler, namely in that the bale wrapper is hung or installed directly behind the round baler, and any access to the bale wrapper through the round baler is blocked from this side. Through the selected connection assembly of the first and second rod linkage parts (namely through the inclined mounted pivotal axes on the first rod part and the thus associated lateral outward pivotal movement of the ends of the first rod parts connected to the second rod parts, as well as through the connection of the second rod parts to one another at the back of the bale wrapper) the entire delimiting rod linkage widens out during pivotal movement into the delimiting position (lowering of the delimiting rod linkage) in the transverse direction to the round baler (beyond the sides of the round baler) and is reduced in the longitudinal direction of the round baler, wherein an approximately three-quarter circle shaped arc is formed around the action region of the bale wrapper. During pivotal movement into the transport or bale ejection position (lifting), however, the opposite effect is achieved, wherein the entire delimiting rod linkage during pivotal movement into the transport position (lifting of the delimiting rod linkage) is narrowed in the transverse direction to the round baler (towards the centre of the round baler) and extends in the longitudinal direction of the round baler wherein an elliptical arc is essentially formed above the action region of the bale wrapper which on the one hand does not (no longer) exceed(s) the permitted transport width and on the other frees up or does not impede the ejection region for the wrapped bales. In this transport or bale ejection position a rotational operation of the bale wrapper is deactivated so that there can be no danger from the bale wrapper.

The invention, as well as further advantages and advantageous developments and configurations of the invention, will now be described and explained in further detail with reference to the drawings which show an embodiment of the invention.

DETAILED DESCRIPTION

Figure 1:
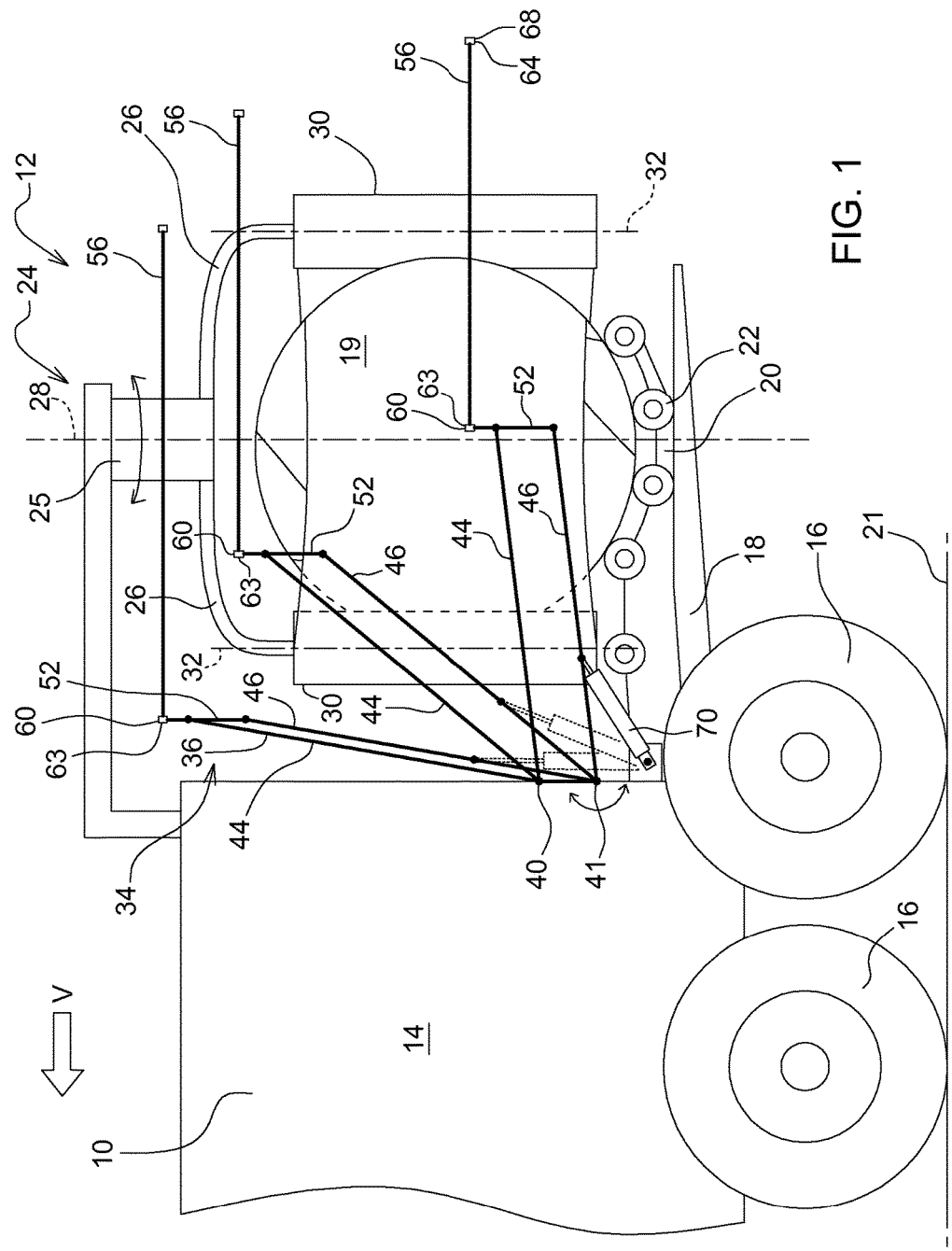
FIG. 1 shows a diagrammatic side view of a combination of a round baler and bale wrapper with a delimiting rod linkage in several height positions.

A round baler 10 illustrated diagrammatically in FIG. 1 is combined with a bale wrapper 12. The round baler 10 comprises a pressing frame 14 which is supported on wheels 16 and is connectable by means of a drawbar (not shown) to a towing vehicle (not shown), e.g. an agricultural tractor, and can be transported by drawing over the ground.

The bale wrapper 12 extends at a rear end of the round baler 10, seen in the forward driving direction (V). The bale wrapper 12 comprises a bale wrapping frame 18 which is attached to the pressing frame 14. A wrapping table 20 on which a bale 19, pressed by the round baler 10, can be positioned extends on the bale wrapping frame 18. The bale wrapper 12 is furthermore provided with a conveying device 22 with which the pressed bale 19 can be moved from the pressing chamber (not shown) of the round baler 10 onto the wrapping table 20 and can after a wrapping process be deposited from there onto the ground 21. A bale wrapping unit 24 is formed on the bale wrapper 12. The bale wrapping unit 24 comprises a rotational drive 25 which is fixed at the top on the bale wrapping frame 18 and is fitted with two rotation arms 26 which are arranged opposite one another and which rotate about a common vertically aligned axis of rotation 28. The rotation arms 26 extend above a bale 19 located on the wrapping table 20 starting from the rotational drive 25 at first transversely to the axis of rotation 28, thus horizontally, and then run at the side of the bale 19 along the axis of rotation 26, thus vertically, in the downward direction (substantially parallel to the axis of rotation 26). A reel 30 of wrapping material, by way of example foil, is mounted rotatably on the vertically extending part of each rotation arm 26, and during a wrapping process for wrapping the bale 19 with wrapping material is guided round the bale by means of the rotation arms 26 wherein the reels 30 rotate about a reel rotation axis 32 which is aligned parallel or coaxial relative to the vertically extending part of the rotation arms 26.

Furthermore a delimiting rod linkage 34 is arranged on the round baler 10 or on the bale wrapper 12. In the illustrated embodiment the delimiting rod linkage 34 is fixed to the sides of the round baler 10 at the rear thereof. The delimiting rod linkage 34 has a first rod linkage part on the left-hand side in the driving direction (V) and a first rod linkage part on the right-hand side in the driving direction 36,38, and these first rod parts are mounted for pivotal movement on the round baler or on the bale wrapper 10 on horizontal pivotal axes 40, 41 (left in the driving direction (V)), 42, 43 (right in the driving direction (V)). The two first rod parts 36, 38 are formed as parallelogram linkage rods wherein each two parallel guided arms 44, 46 (on the left relative to the driving direction (V)) and 48, 50 (on the right relative to the driving direction (V)) are mounted for pivotal movement on the said pivotal axes 40, 41 and 42, 43 respectively. The pivotal ends of the parallel guide arms 44, 46 and 48, 50 are each connected to one another by a vertically aligned connecting rod 52 (on the left in the driving direction (V)), 54 (on the right in the driving direction (V)). The two first rod parts 36, 38 can be pivoted from a lower dropped position into an upper raised position and vice versa, wherein as a result of the parallel arrangement of the arms 44, 46 and 48, 50 the connecting rods 52 and 54 respectively each retain their vertical alignment during pivotal movement. The pivotal axes 40, 41 and 42, 43 are arranged at an acute angle α inclined to the transverse direction of the round baler 10 so that the ends of the first rod parts 36, 38 provided with the connecting rods 52, 54 during pivotal movement from the upper into the lower position pivot sideways backwards and outwards. In other words: during pivotal movement of the first rod parts 36, 38 the connecting rods 52, are moved sideways outwards in a pivotal movement directed from top to bottom simultaneously in relation to the round baler 10, or vice versa, are moved from outwards inwards in relation to the round baler 10 in a pivotal movement directed from the bottom upwards.

The delimiting rod linkage 34 comprises second rod parts 56 (on the left in the driving direction (V)) and 58 (on the right in the driving direction (V)), which adjoin the first rod parts 36, 38 on each side with articulation. The second rod parts 56, 58 are connected to the connecting rods 52, 54 by means of articulated joints 60, 62 which are formed on the connecting rods 52, 54 wherein articulation axes 63, 65 of the joints 60, 62 are aligned vertically so that the second rod parts 56, 58 when pivoting from a lower position into an upper position are held in a constant horizontal alignment, i.e. so that their horizontal alignment does not change during the pivotal movement of the delimiting rod linkage 34 or first rod parts 36, 38, and only the height and position in the longitudinal direction of the round baler 10 changes. Thus in relation to the longitudinal direction of the round baler 10 the second rod parts 56, 58 are brought during pivotal movement from a rear lower position, in the driving direction (V), into a forward upper position, in the driving direction (V). As a result of the articulated attachment of the second rod part 56, 58 to the first rod part 36, 38 respectively, relative movements can take place between the first and the second rod parts 36, 38, 56, 58 which come into effect particularly during pivotal movement of the delimiting rod linkage, as will be described in further detail below.

The second rod parts 56, 58 are brought together with articulation at the ends 64, 66 facing away from the first rod parts 36, 38 through a vertically aligned articulated axis 68. Thus when the delimiting rod linkage 34 is pivoted downwards a rear closure of an action region 69 is produced which is defined by the rotation arms 26 rotating about the axis of rotation 28. Thus the entire action region 69 which would be accessible for an operator or a third party during a bale wrapping process, can be shut off by the delimiting rod linkage 34.

The delimiting rod linkage 34 furthermore comprises an actuator 70, here in the form of a hydraulic cylinder, which permits the raising and lowering of the first rod parts 36, 38 relative to the pressing frame 14. It is also possible here as an alternative by way of example to provide an electric motor or another type of motor-driven actuator 70. The actuator 70 is controllable by way of a control unit (not shown) which initiates the wrapping process, and is synchronised therewith.

The first and second rod parts 36, 38, 56, 58 which form the delimiting rod linkage 34 thus extend on each side of the round baler 10 or bale wrapper 12, preferably laterally starting from a rear side or a region at the back of the round baler 10 along the sides of the bale wrapper 12, and enclose this at the back when the delimiting rod linkage 34 is brought from an upper position into a lower position, wherein the entire region of the bale wrapping unit 24 positioned at the back of the round baler is demarcated horizontally. A strong and stable delimiting rod linkage is thereby produced which, when necessary, namely during the bale wrapping process, can be pivoted down and surrounds the action region 69 and demarcates it from the outside. An operator or a third party is thereby effectively prevented (protected) from reaching into the action region 69. The delimiting rod linkage 34 is to be easily removed again from the action region 69 of the bale wrapper 12 whereby it is pivoted into the upper position, namely into the transport or bale ejection position. In the transport or bale ejection position the rear region of the bale wrapper 12 is freed up so that a finished wrapped bale 19 can be unloaded. The lower position represents the delimiting or bale wrapping position.

Figure 2:
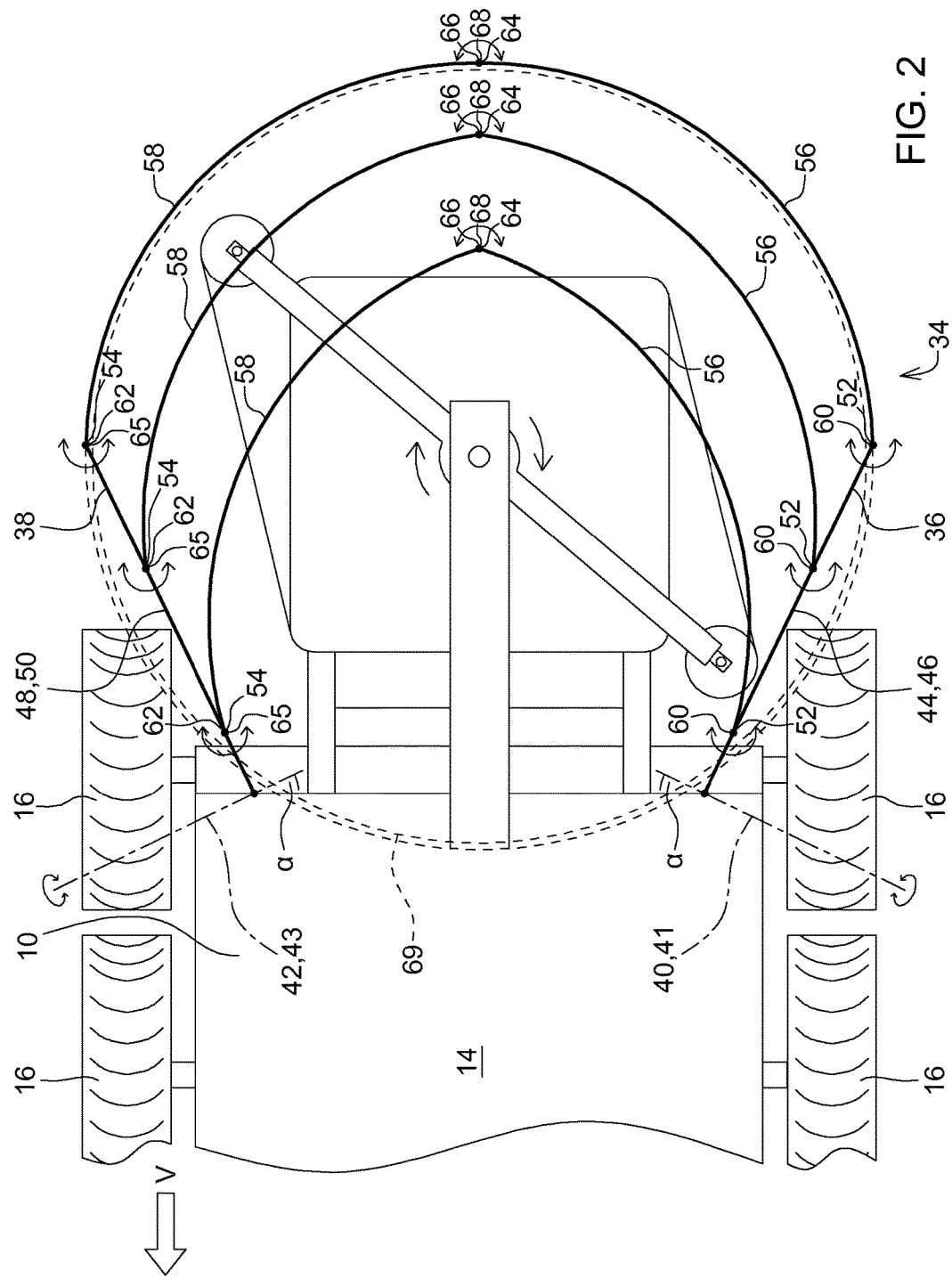
FIG. 2 shows a diagrammatic overview of the combination of round baler and bale wrapper with delimiting rod linkage according to FIG. 1.

The second rod parts 56, 58 are formed from a strong material, by way of example steel rods which through the articulated connection with the first rod parts 36, 38 are moved outwards during pivotal movement from the transport or bale ejection position into the delimiting or bale wrapping position, as can be seen more particularly in FIG. 2, wherein the region bordered by the delimiting rod linkage 34 occupies a narrower width in the transport or bale ejection position than in the delimiting or bale wrapping position. This is clarified by the positions A, B, and C of the delimiting rod linkage 34 shown by way of example in FIG. 2, wherein the upper position A represents the transport or bale ejection position, the position B a middle position and the position C the delimiting or bale wrapping position. It can be clearly seen here that the extension of the delimiting rod linkage 34 during pivotal movement down from position A to position C decreases in the longitudinal direction of the bale wrapper 12 and increases in the transverse direction of the bale wrapper 12 wherein the ends of the second rod parts 56, 58 connected to the connecting arms 52, 54 follow the movement of the connecting arms 52, 54 from inwards to outwards as a result of the inclined arrangement of the pivotal axes 40, 41, 42, 43. This has the advantage that the delimiting rod linkage 34 occupies a clearly narrower width in the transport and bale ejection position and thus the overall width of the round baler which is permitted for transport on roads can be observed. In the delimiting or bale wrapping position the delimiting rod linkage 34 on the other hand projects beyond the sides of the round baler or bale wrapper and demarcates a certain region beyond the sides of the bale wrapper and thus represents a corresponding delimiting projection beyond the sides of the round baler 10.

As can be seen from FIG. 2 the delimiting rod linkage 34 fixed at the back of the round baler 10 forms in the delimiting or bale wrapping position an enclosure or demarcation around approximately three quarters of the action region 69 of the bale wrapper 12. The remaining quarter of the action region 69 of the bale wrapper 12 which is not enclosed by the delimiting rod linkage 34 is covered or demarcated by the back of the round baler 10, namely since the bale wrapper 12 is attached or built on directly behind the round baler 10, and any access to the bale wrapper 12 through the round baler 10 is blocked from this side. In the transport or bale ejection position a rotational operation of the bale wrapper 12 is deactivated due to the system (through the control device) so that no danger can emanate from the bale wrapper 12. Activation of the rotational operation only takes place again after the delimiting rod linkage 34 has been pivoted into the delimiting or bale wrapping position.

The invention claimed is:
1. A round baler with a bale wrapper wherein the bale wrapper comprises:
a bale wrapping unit which rotates about a vertical axis of rotation and has rotation arms which extend parallel to the axis of rotation and which support reels of wrapping material guided inside an action region of the bale wrapping unit extending transversely and longitudinally relative to the axis of rotation, wherein a delimiting rod linkage is arranged on the round baler or on the bale wrapper and extends at the back of the round baler and is capable of pivoting from an upper position located above the bale wrapping unit into a lower position located around the rear and sides of the bale wrapping unit, the delimiting rod linkage being narrower in the transverse direction of the round baler when in the upper position.

2. The round baler of claim 1, wherein the delimiting rod linkage comprises first rod parts arranged on each side of the round baler or bale wrapper, wherein these first rod parts are mounted on horizontal pivotal axes on the round baler or bale wrapper.

3. The round baler of claim 2, wherein the pivotal axes are arranged at an acute angle to the transverse direction of the round baler or bale wrapper in such a way that the first rod parts during pivotal movement of the delimiting rod linkage from the upper into the lower position pivot inclined backwards and outwards.

4. The round baler of claim 2, wherein the delimiting rod linkage comprises second rod parts attached for articulated movement to the first rod parts on each side.

5. The round baler of claim 4, wherein the second rod parts are brought together for articulated movement at their ends facing away from the first rod parts.

6. The round baler of claim 4, wherein the second rod parts are connected to the first rod parts or to one another with articulated movement through vertically aligned articulation axes.

7. The round baler of claim 2, wherein the first rod parts are formed as a parallelogram linkage.

8. The round baler of claim 1, wherein the delimiting rod linkage forms a narrower elliptical arc along the transverse direction in the upper position and a wider circular arc along the transverse direction in the lower position.

9. The round baler of claim 1, wherein the delimiting rod linkage encloses about three quarters of the bale wrapping unit in the lower position.

10. The round baler of claim 1, wherein the delimiting rod linkage and the rear of the round baler enclose the bale wrapping unit when the delimiting rod linkage is in the lower position.

11. The round baler of claim 1, wherein the upper position of the delimiting rod linkage is a transport and bale ejection position and the lower position of the delimiting rod linkage is a bale wrapping position.

12. The round baler of claim 1, wherein the operation of the bale wrapping unit is deactivated when the delimiting rod linkage is in the upper position.

* * * * *